US010395405B2

(12) United States Patent
Knodt

(10) Patent No.: US 10,395,405 B2
(45) Date of Patent: Aug. 27, 2019

(54) REMOVING IDENTIFYING INFORMATION FROM IMAGE DATA ON COMPUTING DEVICES USING MARKERS

(71) Applicant: Kurt Knodt, Palo Alto, CA (US)

(72) Inventor: Kurt Knodt, Palo Alto, CA (US)

(73) Assignee: RICOH COMPANY, LTD., Tokyo (JP)

( * ) Notice: Subject to any disclaimer, the term of this patent is extended or adjusted under 35 U.S.C. 154(b) by 40 days.

(21) Appl. No.: 15/445,915

(22) Filed: Feb. 28, 2017

(65) Prior Publication Data
US 2018/0247439 A1 Aug. 30, 2018

(51) Int. Cl.
G06T 11/60 (2006.01)
G06T 7/70 (2017.01)
G06K 9/00 (2006.01)
G06K 9/18 (2006.01)

(52) U.S. Cl.
CPC .......... G06T 11/60 (2013.01); G06K 9/00442 (2013.01); G06K 9/18 (2013.01); G06T 7/70 (2017.01); G06T 2207/30204 (2013.01)

(58) Field of Classification Search
CPC . G06T 11/60; G06T 7/70; G06T 2207/30204; G06K 9/6267; G06K 9/52
USPC ....... 382/190, 103, 131, 106–107, 162, 168, 382/173, 181, 219, 232, 254–260, 274, 382/276, 286–291, 305, 312, 195; 369/116, 123; 348/345, 349
See application file for complete search history.

(56) References Cited

U.S. PATENT DOCUMENTS

| 7,634,546 | B1 | 12/2009 | Strickholm et al. |
| 8,266,209 | B2 | 9/2012 | Pegg |
| 8,578,463 | B2 | 11/2013 | Kee |
| 8,594,376 | B2 * | 11/2013 | Ogasawara ............. G06T 7/136 382/103 |
| 8,727,209 | B1 * | 5/2014 | Shih ....................... G06Q 30/02 235/375 |
| 8,988,505 | B2 * | 3/2015 | Schaerer ............ A61B 19/5244 348/46 |

(Continued)

FOREIGN PATENT DOCUMENTS

| JP | 2005236843 A | 9/2005 |
| WO | WO01/91033 A2 | 11/2001 |
| WO | WO2017/160487 A1 | 9/2017 |

OTHER PUBLICATIONS

Harrer et al., "The Scalable Adapter Design Pattern: Enabling Interoperability Between Educational Interoperability Between Educational Software Tools", IEEE, vol. 1, No. 2, Apr. 1, 2008, 14 pages. Gamma et al., "Design Patterns" Design Patterns, dated Jan. 1, 1995, 7 pages.

(Continued)

Primary Examiner — Sheela C Chawan
(74) Attorney, Agent, or Firm — Hickman Palermo Becker Bingham LLP; Edward A. Becker

(57) ABSTRACT

An approach is provided for removing information from image data using markers. As used herein, the term "marker" refers to a physical object included in an image of one or more objects when the image is captured. Markers are used to identify, either directly, indirectly, or both, information to be removed from image data. The approach is applicable to any type of information, such as information that identifies one or more individuals, referred to herein as "identifying information."

20 Claims, 10 Drawing Sheets

(56) References Cited

U.S. PATENT DOCUMENTS

| | | | |
|---|---|---|---|
| 9,047,312 B1* | 6/2015 | Ten-Pow | G06F 17/3023 |
| 9,189,699 B2* | 11/2015 | Liu | G06T 11/00 |
| 9,292,974 B2* | 3/2016 | Kaino | G06T 19/006 |
| 9,450,758 B1 | 9/2016 | Allen | |
| 9,646,420 B2* | 5/2017 | Imamura | G06T 19/006 |
| 9,652,665 B2* | 5/2017 | Hanina | G06K 9/00335 |
| 9,769,139 B2 | 9/2017 | Chizhov | |
| 9,965,159 B2* | 5/2018 | Knodt | G06F 3/04845 |
| 2004/0064322 A1 | 4/2004 | Georgiopoulos et al. | |
| 2005/0209886 A1* | 9/2005 | Corkern | G06Q 10/10 705/2 |
| 2006/0161446 A1 | 7/2006 | Fyfe | |
| 2006/0180792 A1* | 8/2006 | Ricci | C03C 3/095 252/301.16 |
| 2009/0010496 A1* | 1/2009 | Saito | G06K 9/3216 382/106 |
| 2010/0014719 A1* | 1/2010 | Date | G06F 17/30247 382/118 |
| 2013/0007773 A1 | 1/2013 | Guilford | |
| 2013/0058471 A1 | 3/2013 | Garcia | |
| 2013/0182007 A1 | 7/2013 | Syed-Mahmood et al. | |
| 2014/0180667 A1 | 6/2014 | Johansson | |
| 2014/0223334 A1 | 8/2014 | Jensen et al. | |
| 2014/0365918 A1 | 12/2014 | Caldwell et al. | |
| 2015/0154183 A1 | 6/2015 | Kristjansson et al. | |
| 2015/0179186 A1 | 6/2015 | Swierk | |
| 2016/0283473 A1 | 9/2016 | Heinze et al. | |
| 2016/0307063 A1 | 10/2016 | Bright et al. | |
| 2017/0255446 A1 | 9/2017 | Malatesha | |
| 2018/0176207 A1 | 6/2018 | Malatesha | |
| 2018/0176267 A1 | 6/2018 | Malatesha | |

OTHER PUBLICATIONS

European Patent Office, "Search Report" in applicatio No. 17207179.7-1222, dated Jan. 25, 2018, 9 pages.

European Patent Office, "Search Report" in application No. 18194528.8-1210, dated Nov. 27, 2018, 8 pages.

Malatesha, U.S. Appl. No. 15/384,184, filed Dec. 19, 2016, Notice of Allowance, dated Oct. 4, 2018.

Malatesha, U.S. Appl. No. 15/384,181, filed Dec. 19, 2016, Office Action, dated Nov. 2, 2018.

* cited by examiner

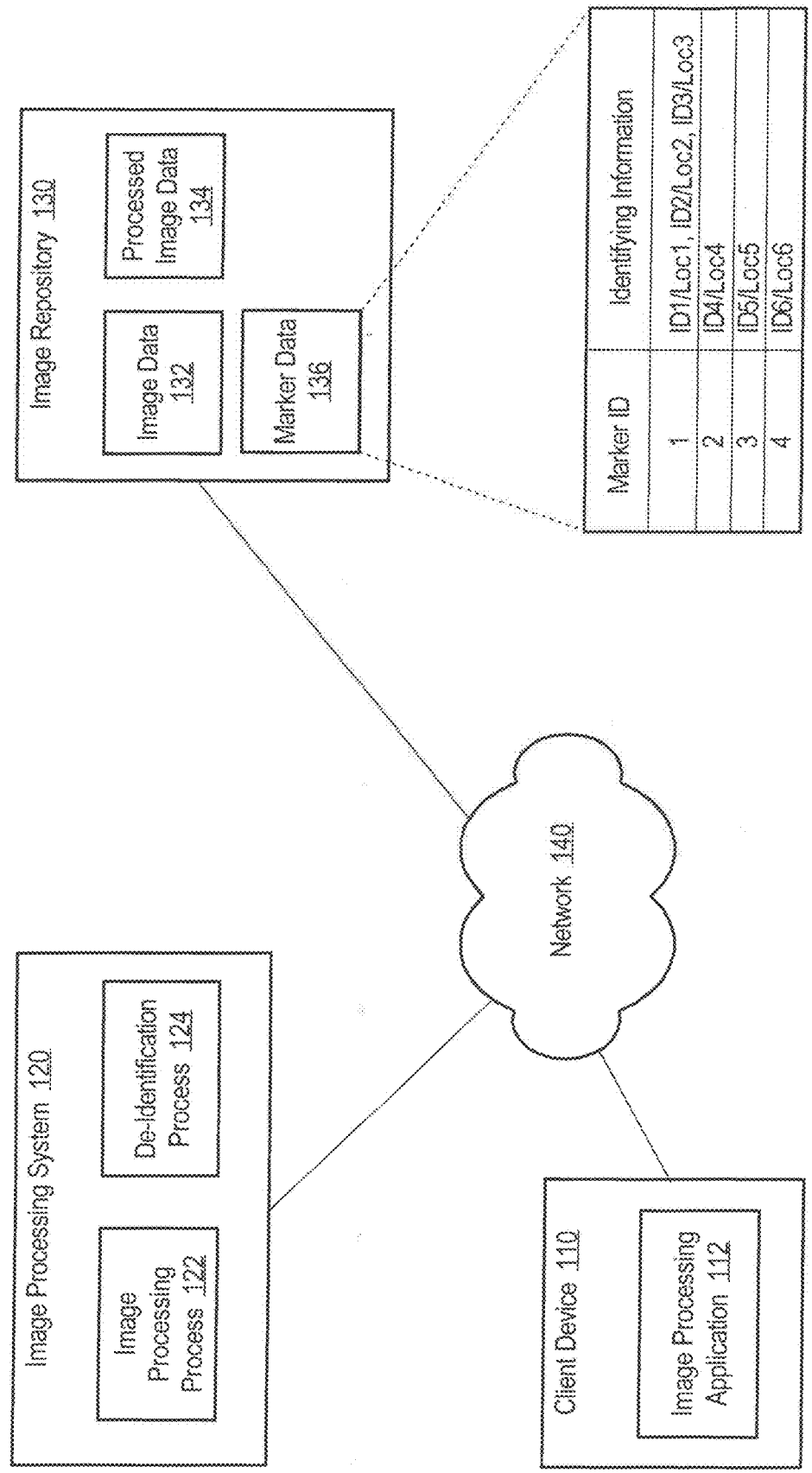

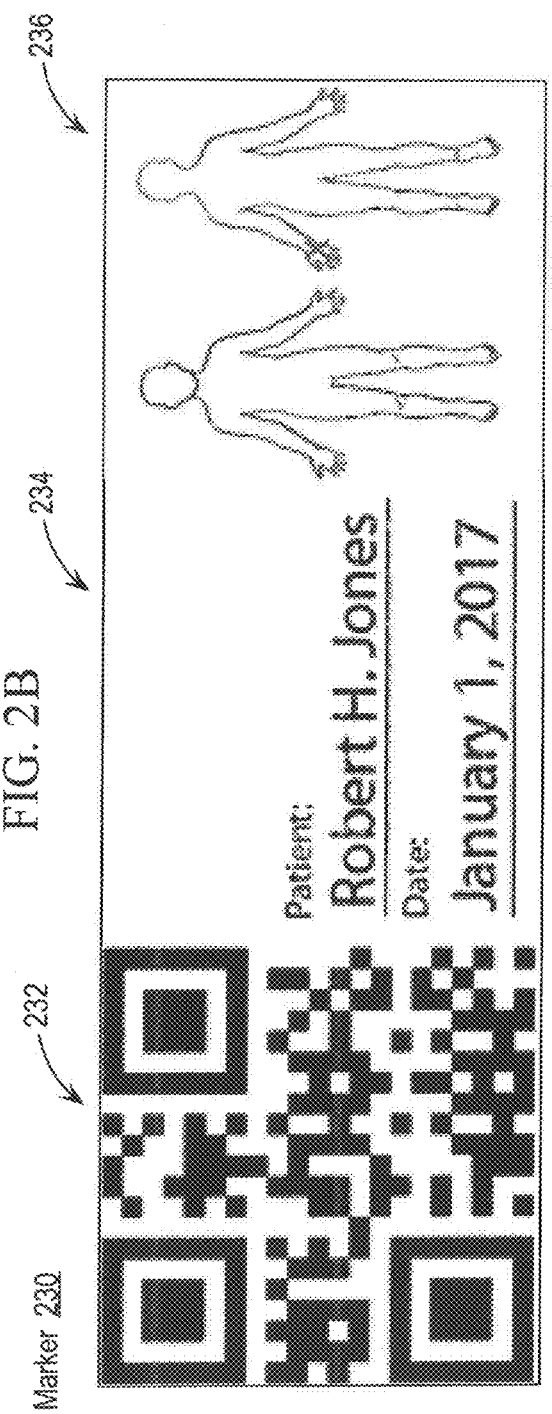

FIG. 2E

DENTAL HEALTH HISTORY
*Confidential*

Today's Date ............
Patient Name ............ Birthdate ............
Last   First   Initial

DENTAL HISTORY

Reason for Today's Visit ............ Date of last dental care ............
Former Dentist ............ Date of last dental X-rays ............
Address ............

Check (✓) if you have had problems with any of the following
- ☐ Bad breath
- ☐ Bleeding gums
- ☐ Clicking or popping jaw
- ☐ Food collection between teeth
- ☐ Grinding teeth
- ☐ Loose teeth or broken fillings
- ☐ Periodontal treatment
- ☐ Sensitivity to cold
- ☐ Sensitivity to hot
- ☐ Sensitivity to sweets
- ☐ Sensitivity when biting
- ☐ Sores or growths in your mouth How often do you floss? ............ How often do you brush? ............

MEDICAL HISTORY

Physician's Name ............ Date of Last Visit ............
Have you had any serious illnesses or operations? ............ If yes, describe ............
Have you ever had a blood transfusion? ☐ Yes ☐ No If yes, give approximate dates ............
Have you ever taken any of the group of drugs collectively referred to as "fen-phen?" These include combinations of Ionimin, Adipex, Fastin (brand names of phentermine), Pondimin (fenfluramine) and Redux (dexfenfluramine.) ☐ Yes ☐ No
(Women) Are you pregnant? ☐ Yes ☐ No   Nursing? ☐ Yes ☐ No   Taking birth control pills? ☐ Yes ☐ No Check (✓) if you have or have had any of the following:
- ☐ Anemia
- ☐ Arthritis, Rheumatism
- ☐ Artificial Heart Valves
- ☐ Artificial Joints
- ☐ Asthma
- ☐ Back Problems
- ☐ Blood Disease
- ☐ Cancer
- ☐ Chemical Dependency
- ☐ Chemotherapy
- ☐ Circulatory Problems
- ☐ Cortisone Treatments
- ☐ Cough, Persistent
- ☐ Cough up Blood
- ☐ Diabetes
- ☐ Epilepsy
- ☐ Fainting
- ☐ Glaucoma
- ☐ Headaches
- ☐ Heart Murmur
- ☐ Heart Problems
- ☐ Hemophilia
- ☐ Hepatitis
- ☐ High Blood Pressure
- ☐ HIV/AIDS
- ☐ Jaw Pain
- ☐ Kidney Disease
- ☐ Liver Disease
- ☐ Mitral Valve Prolapse
- ☐ Pacemaker
- ☐ Radiation Treatment
- ☐ Respiratory Disease
- ☐ Rheumatic Fever
- ☐ Scarlet Fever
- ☐ Shortness of Breath
- ☐ Skin Rash
- ☐ Stroke
- ☐ Swelling of Feet or Ankles
- ☐ Thyroid Problems
- ☐ Tobacco Habit
- ☐ Tonsillitis
- ☐ Tuberculosis
- ☐ Ulcer
- ☐ Venereal Disease

MEDICATIONS

List medications you are currently taking: ............

Pharmacy Name ............
Phone ............

ALLERGIES
- ☐ Aspirin
- ☐ Barbiturates (Sleeping pills)
- ☐ Codeine
- ☐ Local Anesthetic
- ☐ Penicillin
- ☐ Sulfa
- ☐ Latex
- ☐ Other

SIGNATURE

To the best of my knowledge, the above information is complete and correct. I understand that it is my responsibility to inform my dentist if I, or my minor child, ever have a change to health.

Signature of Patient, Parent, Guardian or Personal Representative ............ Date ............

Please print name of Patient, Parent, Guardian or Personal Representative ............ Relationship to Patient ............

Marker 280

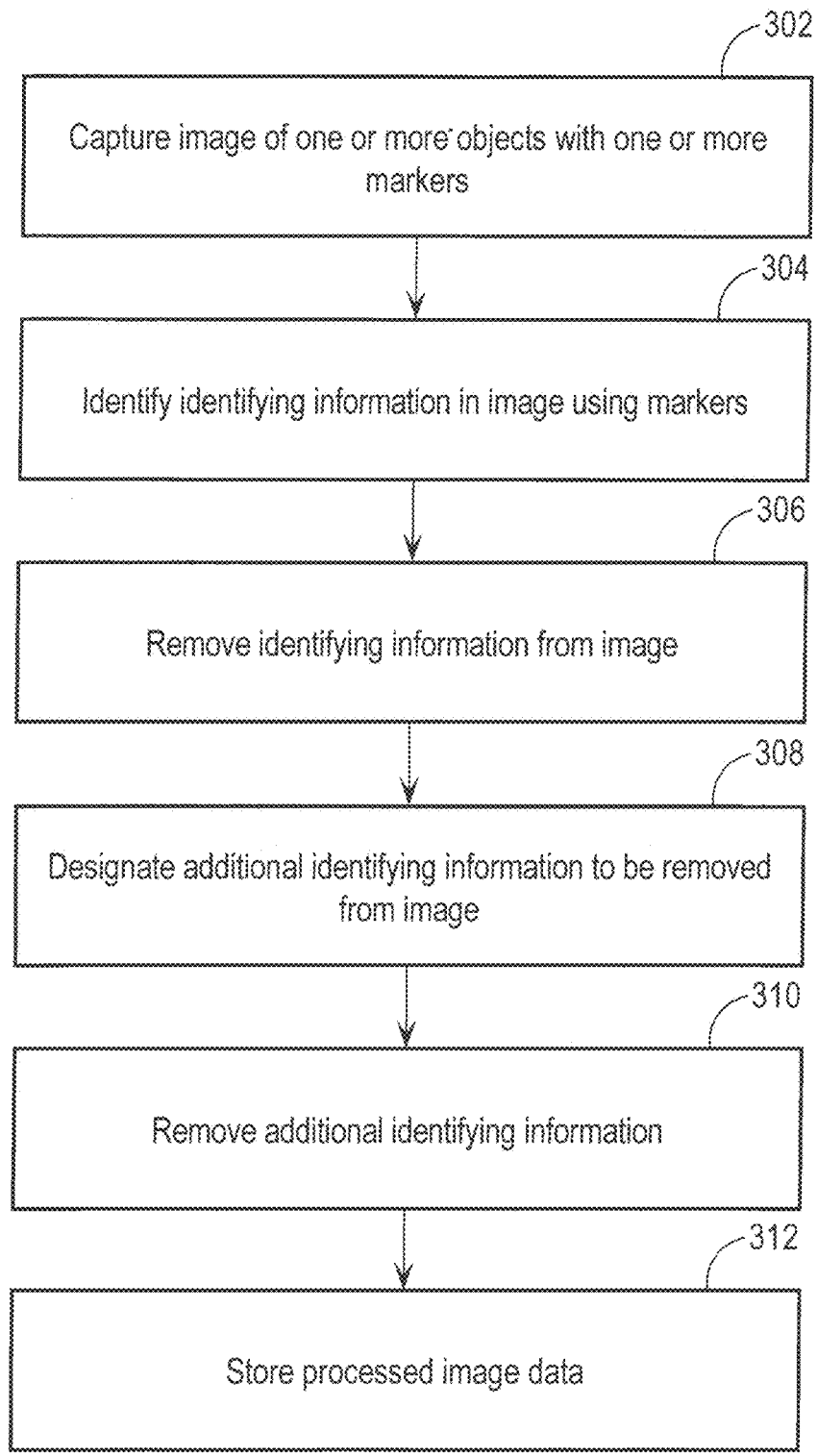

REMOVING IDENTIFYING INFORMATION FROM IMAGE DATA ON COMPUTING DEVICES USING MARKERS

FIELD OF THE INVENTION

Embodiments relate generally to removing identifying information from image data using markers.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The proliferation of computer networks, and in particular the Internet, has given rise to increased concerns about the dissemination of personal information. In the healthcare industry, standards have been developed, such as the Health Insurance Portability and Accountability Act (HIPPAA), to protect patient information, also referred to as Protected Health Information (PHI). Conversely, however, there is often a need for health care professionals, such as physicians and educators, to share and collaborate on patient information to provide treatment and for educational purposes, respectively. For example, image data that contains identifying information, e.g., information that identifies a person, is often shared among physicians to obtain a second opinion on a condition. One approach for addressing these issues is to manually remove identifying information from image data using, for example, image editing software. This approach, however, is labor intensive and prone to errors. For example, not all identifying information may be removed from an image and valuable portions of image data that do not contain identifying information may be accidentally removed.

SUMMARY

An apparatus includes one or more processors and one or more memories communicatively coupled to the one or more processors. The one or more memories store instructions which, when processed by the one or more processors causes retrieving first image data for a particular image of one or more objects, wherein the particular image of the one or more objects includes one or more markers that were present in the particular image of the one or more objects when the particular image of the one or more objects was captured. The one or more markers are represented in the first image data. A determination is made, based upon the one or more markers included in the particular image, of identifying information to be removed from the particular image, wherein the identifying information identifies one or more persons. Second image is generated based upon the first image data and the identifying information to be removed from the particular image. The second image data includes the first image data but without the identifying information.

BRIEF DESCRIPTION OF THE DRAWINGS

In the figures of the accompanying drawings like reference numerals refer to similar elements.

FIG. 1 is a block diagram that depicts an arrangement for processing image data using markers to remove information from the image data.

FIG. 2B depicts a marker in the form of a patient identification (ID) label or card that may be placed on, adjacent to, or attached to, a patient.

FIG. 2C depicts a marker in the form of a patient ID label or card that may be placed on, or attached to, a patient.

FIG. 2E depicts an image of a dental health history form that uses markers in the form of symbols to identify identifying information that is to be removed during a de-identification process.

FIG. 3 depicts a flow diagram of an example end-to-end workflow for removing identifying information from image data using markers.

DETAILED DESCRIPTION

Figure 2A:
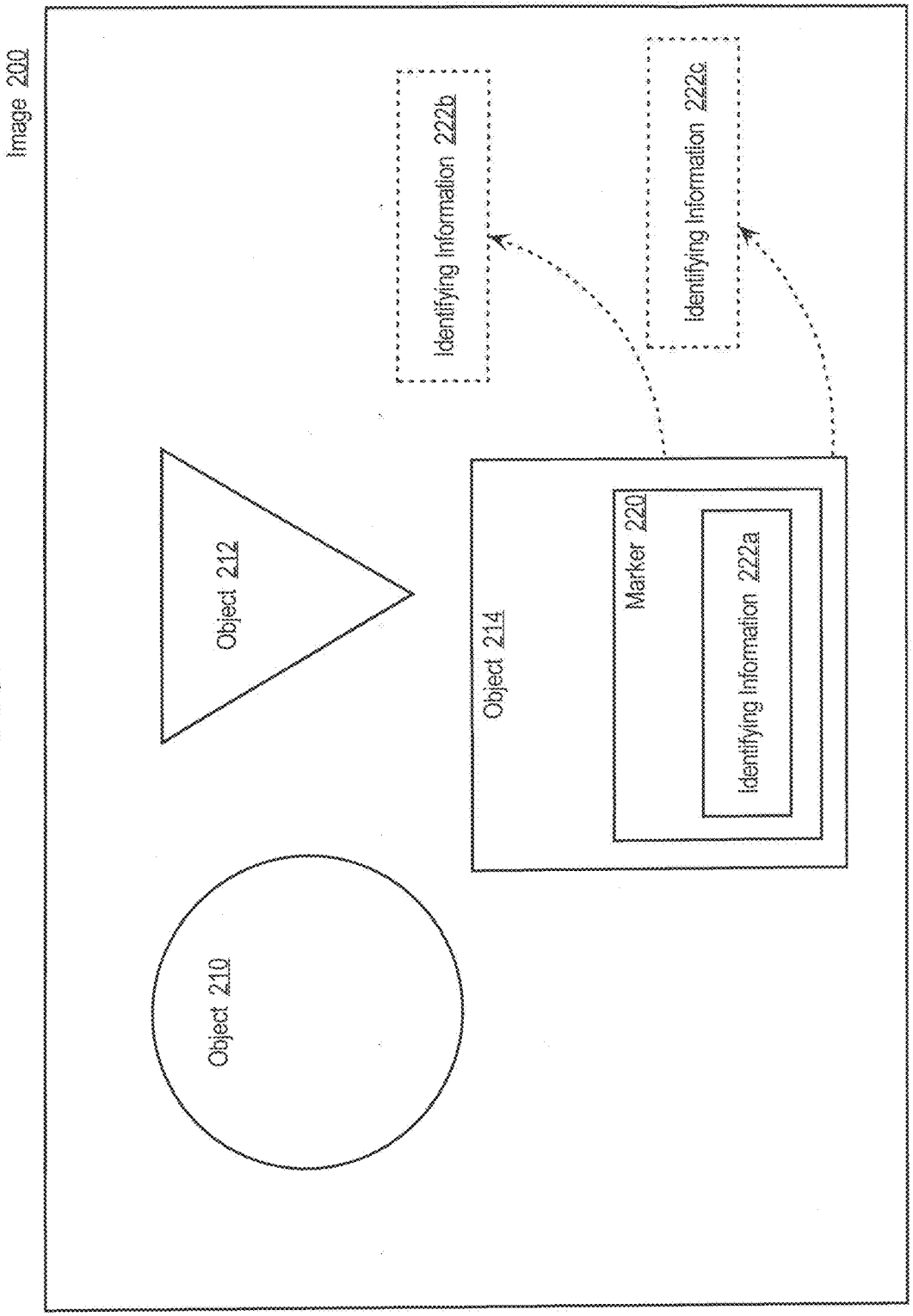
FIG. 2A depicts an image that includes three objects.

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. Overview
II. System Architecture
  A. Overview
  B. Client Device
  C. Image Processing System
  D. Image Repository
III. Markers
IV. Removing Information From Image Data Using Markers
V. Implementation Examples

I. Overview

An approach is provided for removing information from image data using markers. As used herein, the term "marker" refers to a physical object included in an image of one or more objects when the image is captured. As described in more detail hereinafter, markers are used to identify, either directly, indirectly, or both, information to be removed from image data. The approach is applicable to any type of information, such as information that identifies one or more individuals, referred to herein as "identifying information." For example, in the medical context, the approach may be used to remove identifying information from medical images to satisfy organization policies, industry requirements, or regulatory requirements. While embodiments are described herein in the context of removing identifying information from image data, this is done for explanation purposes only. Embodiments are not limited to this context and other information, including information that does not directly identify an individual, may be removed from images using the approaches described herein. The approach may improve the performance of computing systems by reducing the amount of computational resources, storage resources, and/or time required to remove information from image data.

II. System Architecture

FIG. 1 is a block diagram that depicts an arrangement 100 for removing identifying information from image data using markers. The particular elements depicted in arrangement are not all required, and embodiments are applicable to arrangement 100 having fewer elements or additional elements that may vary depending upon a particular implementation.

A. Overview

In the example depicted in FIG. 1, arrangement 100 includes a client device 110, an image processing system 120, and an image repository 130 communicatively coupled by network 140. Arrangement 100 may include fewer or additional elements that may vary depending upon a particular implementation. Network 140 may be implemented by any number and types of networks that may vary depending upon a particular implementation. The elements depicted in FIG. 1 may also have direct communications links with each other and with other elements not depicted in FIG. 1.

B. Client Device

Client device 110 may be any type of client device that is capable of interacting with image processing system 120 and/or image repository 130. Example implementations of client device 110 include, without limitation, a workstation, a personal computer, a laptop computer, a tablet computing device, a personal digital assistant, a smart phone, an interactive whiteboard appliance, etc. According to one embodiment, client device 110 is configured with an image processing application 112 for interacting with image processing system 120 and image repository 130. Image processing application 112 may provide access to various image processing functionality and workflows provided by image processing system 120. Image processing application 112 may be implemented by one or more stand-alone processes, or one or more processes integrated into one or more other processes on client device 110. One non-limiting example implementation of image processing application 112 is a Web application that executes in a Web browser.

C. Image Processing System

Image processing system 120 is configured to process image data, and according to one embodiment, includes an image processing process 122 for processing images, and a de-identification process 124 for removing identifying information from image data using markers. Image processing system 120 may include any number of other processes and additional functionality that may vary depending upon a particular implementation, and image processing system 120 is not limited to any particular processes or functionality.

Image processing process 122 provides various functionality for processing images including, for example, workflows for manually editing images and removing identifying information from images. For example, image processing process 122 may provide a viewer/editor that allows a user of image processing application 112 to view images and manually remove identifying information from images, e.g., using tools that allow the user to select areas in an image to be deleted, cleared, overwritten, etc.

As described in more detail hereinafter, de-identification process 124 identifies and/or removes identifying information from image data based upon markers included in images at the time the images were captured. Markers may themselves include identifying information that is to be removed from images. Alternatively, or in combination, identifying information to be removed may be in other locations of images, i.e., locations outside, or other than, where the markers are present in images. Locations of identifying information may be specified by location data contained in markers, and/or by data that is separate from the markers themselves. For example, marker data 136 may be maintained by image repository 130 and marker data 136 specifies, for each of a plurality of markers, identifying information to be removed from images. Each marker may specify different identifying information to be removed, or multiple markers may correspond to and define particular identifying information to be removed.

De-identification process 124 may automatically remove identifying information from image data, or may merely detect identifying information in image data and notify another process, such as image processing process 122, of the identifying information detected in the image data. For example, image processing process 122, operating in conjunction with de-identification process 124, may provide an image viewer/editor that notifies a user of the existence of identifying information, and allow the user to manually confirm or cancel the deletion of the detected identifying information. In this manner, image processing system 120 provides a tool that combines automatic detection of identifying information in image data by de-identification process 124, with manual removal of identifying information by a user.

Image processing system 120 may also be used in an automated manner to automatically process a batch of images to comply with one or more organizational, industry or regulatory requirements pertaining to the removal of identifying information from images. For example, suppose that image data 132 includes a large number of patient images acquired at a medical facility, such as a hospital. The images may include, for example, camera images, X-ray images, CAT scan images, etc., and the images include identifying information that identifies one or more persons, e.g., patients. Image processing system 120 may automatically process the patient images in image data 132 and remove the identifying information to generate processed image data 134 that does not contain the identifying information so that it complies with particular medical records standards or regulatory requirements. This use of image processing system 120 may be initiated, for example, by an application, such as image processing application 112, which invokes one or more interfaces, such as one or more application program interfaces (APIs), supported by image processing system 120, which provide access to functionality provided by image processing system 120. For example, image processing application 112 may implement an API supported by image processing system 120 to access functionality provided by image processing system 120. As another example, the de-identification approaches described herein may be used to automatically remove identifying information from images in response to detecting that images are being transmitted outside of a specified network, e.g., to a third party network. The de-identification approaches may be implemented at a network element to remove identifying information from images before the images are transmitted to the third party network.

Identifying information that is removed from images by de-identification process 124 may include a wide variety of identifying information and is not limited to any particular type of identifying information. For example, identifying information may include data that identifies a person, such as names, social security numbers, patient identification numbers, signatures, codes, image data that uniquely identifies an individual, etc. Identifying information may be related to a person without constituting personal identification data per se. For example, identifying information removed from image data may include information about a person, address information, test results, portions of image data, etc.

De-identification process 124 may be implemented by one or more processes of any type, such as one or more stand-alone applications, library routines, plug-ins, etc. De-identification process 124 may be implemented separate from image processing process 122, as depicted in FIG. 1, or integrated into image processing process 122. In addition, de-identification process 124 may be implemented external to image processing system 120, for example, as an external process.

D. Image Repository

Image repository 130 stores image data for images. According to one embodiment, image repository 130 includes image data 132 and processed image data 134. Image data 132 includes image data for one or more images. Processed image data 134 includes image data for one or more images that has been processed, for example, by de-identification process 124 to remove identifying information from the image data. One or more portions of processed image data 134 may correspond to image data 132, but it is not required that all images represented by processed image data 134 have corresponding image data in image data 132. Image repository 130 may include one or more processes for managing image data 132 and processed image data 134, for example, for responding to requests from image processing system 120, client device 110, etc., to store and retrieve image data 132 and processed image data 134. Image repository 130 may be implemented by any type of system or method for storing data. For example image repository 130 may be implemented as a database management system, a file system, etc., and may include computer hardware, computer software, or any combination of computer hardware and computer software. In other embodiments, image repository 130 may be implemented as any type of organized or unorganized data, such as a database, one or more data files, one or more data structures, etc., without constituting a system per se.

III. Markers

Markers may be implemented in a wide variety of ways that may vary depending upon a particular implementation, and embodiments are not limited to any particular type or form of marker. One characteristic of markers is that they are identifiable in image data. The identification of markers in image data may be accomplished, for example, by detecting one or more attributes of markers in image data. For example, markers may be in the form of an object that has a particular shape, color, texture and/or location that can be identified in image data. Markers may also be identified by a unique code or signature, uncoded or coded, which can be identified when image data is processed. For example, a marker may include encoded data in the form of a Quick Response (QR) code, an Aztec code, or a bar code, which identifies the marker.

FIG. 2A depicts an image 200 that includes three objects 210, 212, 214. According to one embodiment, image 200 includes a marker 220 on object 214. When image 200 is captured, for example by a camera or other image capture device, marker 220 is included on object 214 in image 200. Example implementations of marker 220 include, without limitation, a physical card, tag, or label that is placed on object 214 when image 200 is captured.

In the example depicted in FIG. 2A, marker 220 includes identifying information 222a that is detected in, and removed from, the image data for image 200 using the de-identification techniques described herein. According to one embodiment, identifying information 222a is information that identifies a person, such as a name, an identification number, a social security number, a patient number, etc., or any combination thereof. Identifying information 222a may be in different forms that may vary depending upon a particular implementation, and embodiments are not limited to identifying information 222a being in a particular form. For example, identifying information 222a may be in human-readable form or machine-readable form, and may be encoded or unencoded. Identifying information 222a may include other information that while itself may not definitively identify a person per se, may also be removed by the de-identification processes described herein. Examples of other information include, without limitation, address information, employment information, medical information, etc.

As depicted in FIG. 2A, identifying information 222a is located on or within marker 220. Identifying information may also be located outside of, external to, or separate from a marker. As depicted in FIG. 2A, identifying information 222b, 222c are separate from marker 220 and may also be identified and removed by the de-identification processes described herein. Embodiments may include any amount and types of identifying information located within a marker, separate from a marker, or both within a marker and separate from a marker.

Identifying information may be referenced by a marker. For example, marker 220 may include data that identifies and/or specifies the locations of identifying information 222a, 222b, 222c. When image de-identification process 124 processes the image data for image 200 and identifies the presence of marker 220 in image 200, de-identification process 124 may determine from marker 220 itself, the locations of identifying information 222a, 222b, 222c.

Alternatively, data separate from markers, such as marker data 136, may specify information that allows de-identification process 124 to locate and remove the identifying information from an image. For example, marker data 136 may include data that indicates that one or more of identifying information 222a, 222b, 222c are associated with marker 220, and specify the locations of identifying information 222a, 222b, 222c. When de-identification process 124 processes the image data for image 200, and identifies the presence of marker 220 in image 200, de-identification process 124 may examine marker data 136 to determine the locations of identifying information 222a, 222b, 222c.

FIG. 1 depicts an example implementation of marker data 136 in which each row of the table corresponds to a particular marker and includes a marker ID and identifying information. The marker ID may be any type of data, in any format, which may vary depending upon a particular implementation. In the example depicted in FIG. 1, the marker ID is expressed as an integer number, but embodiments are not limited to this example. In the example depicted in FIG. 1, the identifying information specifies an identification and/or location, i.e., "ID#/Loc#", for identifying information that corresponds to each marker. For example, the first row of marker data 136 may correspond to marker 220 (FIG. 2A) and the identifying information may specify an identification and/or location for identifying information 222a, 222b, 222c. The location information may be used by de-identification process 124 to locate and remove the corresponding identifying information from image data. For example, location information may specify one or more pixel locations within an image where identifying information is located within image data. A single pixel location with a length, or multiple pixel locations, may be used to specify the location of identifying information within an image. In situations where only an identifier is provided without location information, de-identification process 124 may use the identifier to locate the identifying information within image data. For example, the identifier may be a signature, code, or other attribute, that can be located by image processing process 122 within image data.

As previously mentioned herein, markers may be embodied in many different forms that may vary depending upon a particular implementation. FIG. 2B depicts a marker 230 in the form of a patient identification (ID) label or card that may be placed on, adjacent to, or attached to, a patient. Marker 230 includes barcode data 232, identifying information 234, and other information 236. Barcode data 232 is encoded data, in the form of a barcode, that identifies marker 230 as a marker. Barcode data 232 may specify the size and/or location of marker 230, identifying information 234, and/or other information 236, or any combination thereof. The locations may be expressed in relation to the position of barcode data 232, marker 230, absolute locations or positions with an image, or any other method that allows de-identification process 124 to locate identifying information 234 and/or other information 236 within image 200. Alternatively, barcode data 232 may only identify marker 230 as a marker, and separate marker data, such as marker data 136, may specify the size and/or location of marker 230, identifying information 234, and/or other information 236.

In the example depicted in FIG. 2B, identifying information 234 identifies a patient "Robert H. Jones" by name, and also includes a date of "Jan. 1, 2017," which may represent a date on which the patient received medical services. Embodiments are not limited to this example, and other types of identifying information may be used. Other information 236 includes non-patient specific information in the form of body photo locator. During the de-identification processes described herein, one or more portions of identifying information 234, or all of identifying information 234, is removed from an image that contains marker 230. For example, the patient's name "Robert H. Jones" may be removed from identifying information 234 so that marker 230 cannot be attributed to the patient "Robert H. Jones." One or more portions, including all, of other information 236 are optionally removed from the image that contains marker 230.

FIG. 2C depicts a marker 240 in the form of a patient ID label or card that may be placed on, or attached to, a patient. Marker 240 includes QR code data 242, in the form of a QR code, and identifying information 244. In the example depicted in FIG. 2C, marker 240 does not include any other information, but embodiments that use QR code data are not limited to this example and may include other information. Similar to the marker 230 of FIG. 2B, QR code data 242 is encoded data, in the form of a barcode, that identifies marker 240 as a marker. QR code data 242 may specify the size and/or location of marker 240 and/or identifying information 244. Alternatively, QR code data 242 may only identify marker 240 as a marker, and marker data 136 may specify the size and/or location of marker 240 and identifying information 244. In the example depicted in FIG. 2C, the size of QR code data 242 is smaller than the physical dimensions of marker 240. Embodiments are not limited to encoded data fitting within the physical dimensions of a marker and encoded data may extend beyond the borders of a marker and/or be outside a marker. In addition, although embodiments are described herein and depicted in the figures in the context of encoded data being positioned on the left-hand portion of markers, embodiments are not limited to these examples and encoded data, or other symbols, signatures, etc., may be located anywhere on markers. In the example depicted in FIG. 2C, identifying information 244, which includes a patient identification number, is encoded in the form of a barcode.

Figure 2D:
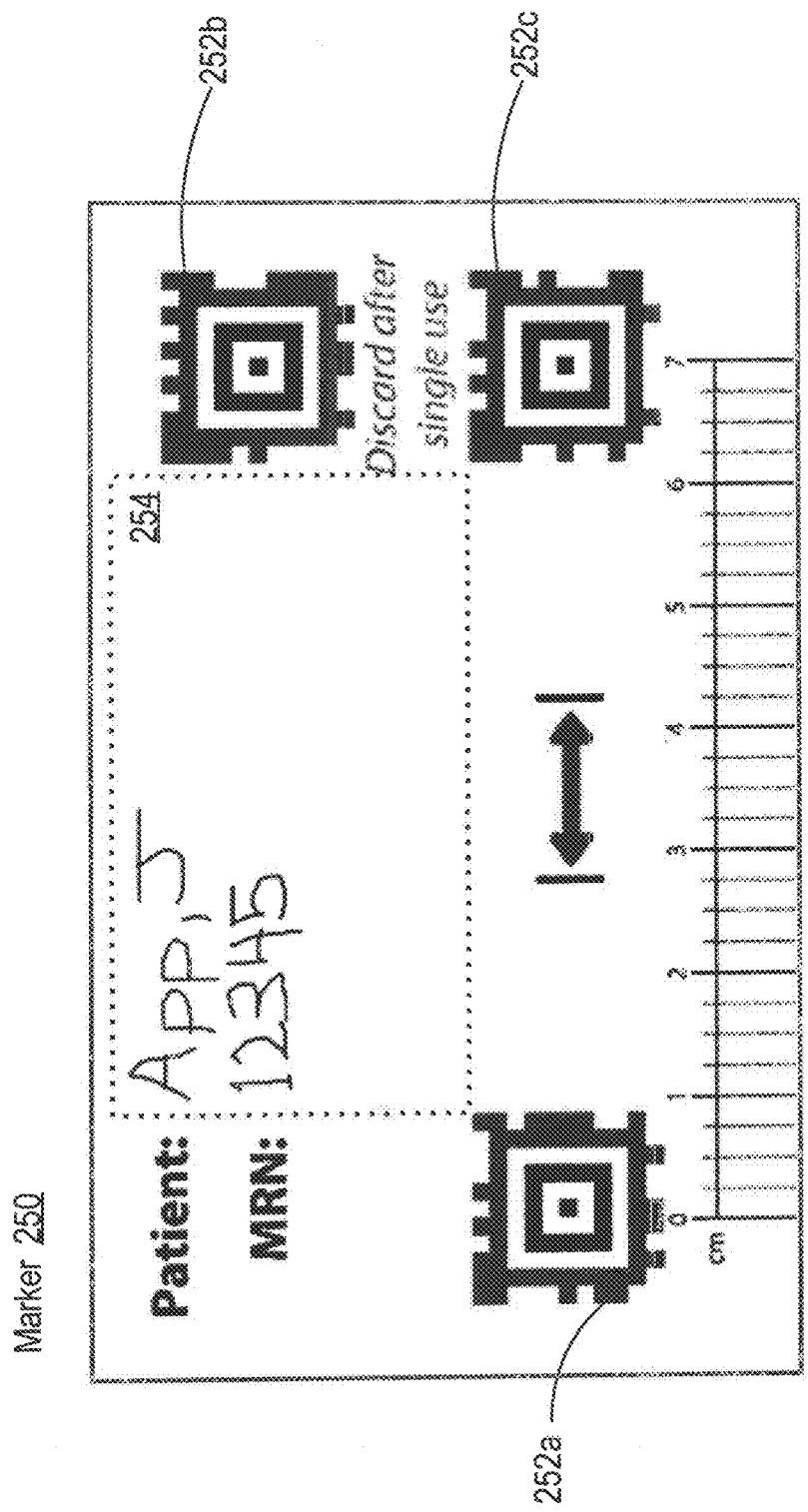
FIG. 2D depicts a marker in the form of a patient ID label or card that may be placed on, or attached to, a patient.

FIG. 2D depicts a marker 250 in the form of a patient ID label or card that may be placed on, or attached to, a patient. Marker 250 includes hand-written patient information in the form of a patient name and medical record number (MRN). Marker 250 includes symbols, in the form of Aztec codes 252a, 252b, 252c, that define identifying information 254 that is to be removed by de-identification process 124. As described in more detail hereinafter, Aztec codes 252a, 252b, 252c may also be used to adjust an area containing identifying information to be removed from image data in situations where an image was captured at an angle other than 90 degrees to the device used to capture the image. For example, if a determination is made that an image was captured at an angle other than 90 degrees, then the region that contains the identifying information may be adjusted based upon the angle at which the image was captured.

According to one embodiment, specified data, such as symbols, may be used instead of, or in addition to, location data, to designate identifying information that is to be removed during a de-identification process. The specified data may be a wide variety of data that may vary depending upon a particular implementation and embodiments are not limited to any particular type of specified data. The specified data may define identifying information that resides within a marker, or separate from markers.

FIG. 2E depicts an image 260 of a dental health history form that uses markers in the form of symbols to identify identifying information that is to be removed during a de-identification process. Image 260 includes markers 262a, 262b, 262c, 262d that define a first region of identifying information 264 to be removed by de-identification process 124. As depicted in FIG. 2E, identifying information 264 includes personal information about a dental patient, including name and birthdate. Image 260 also includes markers 266a, 266b, 266c, 266d that define a second region of identifying information 268 to be removed by de-identification process 124. Identifying information 268 includes the name of the dental patient, signature and relationship to the patient.

In the example depicted in FIG. 2E, markers 262a-262d, 266a-266d are in the form of Aztec codes that each include encoded data that identifies the Aztec codes as markers within image 260. Markers 262a-262d, 266a-266d may be included as part of the dental health history form when the form is created, or attached to the form, for example, via stickers, cards, etc., after the form has been created. The encoded data may be any type of data that is known to de-identification process 124 to identify a marker. For example, the data that is encoded may be a specified number, code or signature. According to one embodiment, markers may not be visually discernable by humans. For example, a marker may be implemented as a watermark or non-visible information that is not readily visually detectable by humans, but is detectable by de-identification process 124.

According to one embodiment, markers are associated in a manner that allows the first and second regions of identifying information 264, 268 to be determined. The markers themselves may include data that specifies the associations. For example, marker 262a may include data that identifies marker 262a as the upper left corner of a region, marker 262b may include data that identifies marker 262b as the lower left corner of the region, marker 262c may include data that identifies marker 262c as the upper right corner of the region, and marker 262d may include data that identifies marker 262d as the lower right corner of the region. As another example, markers may identify a sequence, such as 1 of 4, 2 of 4, 3 of 4, and 4 of 4, to allow de-identification process 124 to determine the region of identifying information 264. Alternatively, markers may merely include data that identifies the markers as markers, and marker data 136 may specify the associations between the markers to define regions of identifying information. Although embodiments are described herein and depicted in the figures in the context of regions of identifying information that are rectangular in shape, embodiments are not limited rectangles, and regions of identifying information may be any shape, including any type of polygon and circular shapes.

IV. Removing Information from Image Data Using Markers

FIG. 3 depicts a flow diagram 300 of an example end-to-end workflow for removing identifying information from image data using markers. Embodiments are not limited to this example and not all of the steps depicted in FIG. 3 and described herein are required.

Figure 4B:
FIG. 4B depicts an image with all of the information on a marker deleted, except for encoded data.
Figure 4A:
FIG. 4A depicts an example image of the famous boxer Mike Tyson.

In step 302, an image of one or more objects is captured and the captured image includes one or more markers. The image may be captured by any type of image capture device, such as a camera, smart phone, personal digital assistant, tablet computing device, laptop computer, etc., and stored, for example, in image data 132 in image repository 130. FIG. 4A depicts an example image 400 of the famous boxer Mike Tyson. Image 400 includes a marker 402 that may have been included on the one or more objects in image 400, i.e., physically attached to the left cheek of Mike Tyson at the time image 400 was captured, or marker 402 may have been digitally added to image 400. In this example, marker 402 may be a card that includes printed information. Marker 402 includes encoded data 404, in the form of a QR code, that specifies one or more attributes of marker 402. For example, encoded data 404 may specify the location and/or size of marker 402, and optionally the location and/or size of encoded data 404. Encoded data 404 may also specify the size and/or location of identifying information. For example, the identifying information may include the entire marker 402 except for encoded data 404. As another example, the identifying information may include a portion of marker 402, such as identifying information 406, which specifies the patient's name "Mike Tyson."

In step 304, identifying information is identified or detected in the image using markers. For example, de-identification process 124 analyzes the image data for image 400 to identify marker 402 in the image data for image 400. This may be accomplished, for example, by de-identification process 124 identifying encoded data 404 in the image data for image 400. For example, de-identification process 124 may be configured to recognize encoded data 404 in image data. De-identification process 124 then determines the identifying information, either from data contained within encoded data 404, or marker data 136. For example, encoded data 404, or marker data 136, may specify the identifying information to be everything on marker 402, except for encoded data 404. Alternatively, the identifying information may be just identifying information 406. According to one embodiment, a marker may also specify one or more actions to be performed. For example, a marker may include checkboxes that may be manually selected by a user and one of the checkboxes may be a "de-identification" checkbox. De-identification as described herein may be performed in response to detecting selection of the "de-identification" checkbox.

In step 306, the identifying information that was identified or detected in the image using markers is removed from the image. FIG. 4B depicts image 400 with all of the information on marker 402 deleted, except for encoded data 404. This may be done, for example, by overwriting the image values with a solid color so that the original identifying information is not recoverable. The particular manner in which identifying information is deleted from images may be performed in accordance with a standard or regulation that specifies a particular manner of removing identifying information from images. According to one embodiment, a marker may specify a manner of removing identifying information from an image. For example, a marker may specify a particular method or protocol to be used to delete or remove identifying information from the image data for an image.

Figure 4D:
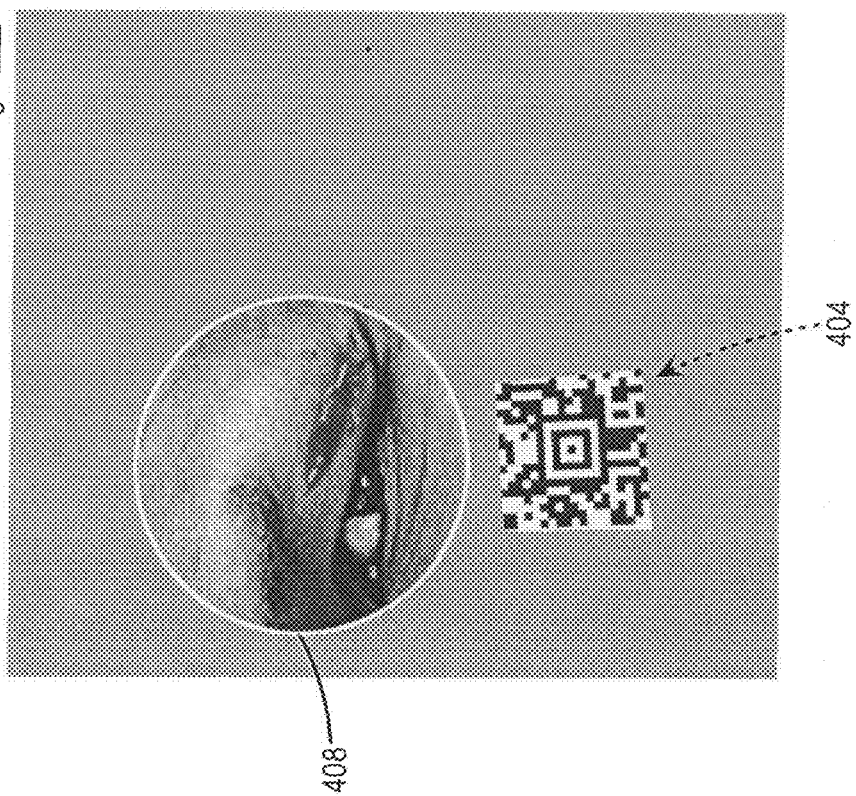
FIG. 4D depicts the removal of the additional information outside circle, except for encoded data.
Figure 4C:
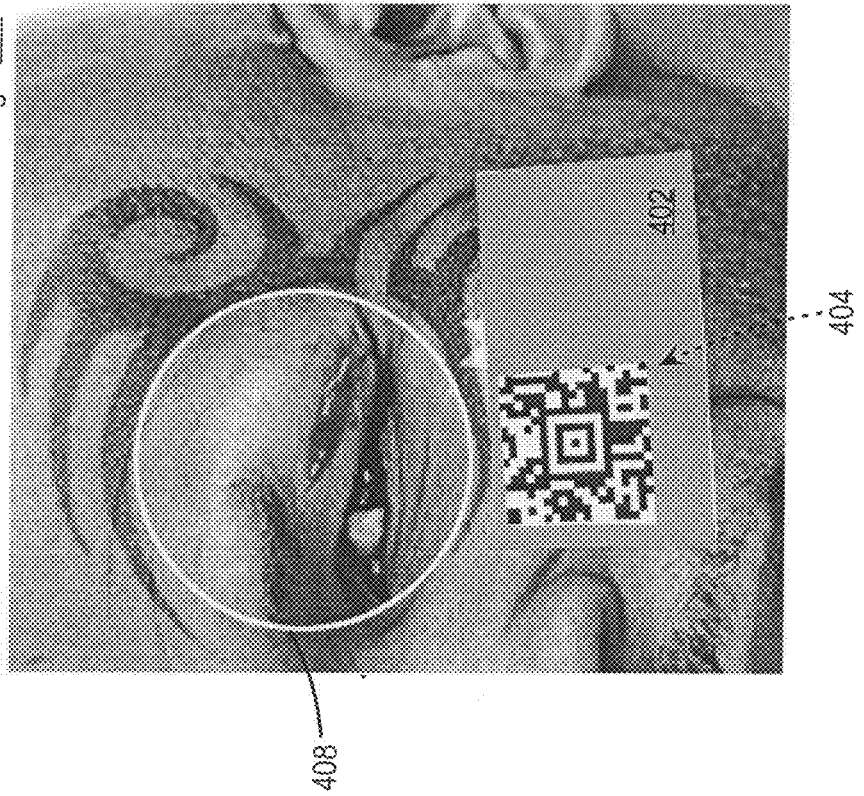
FIG. 4C depicts a manual de-identification marker, in the form a circle, manually created by a user to designate additional information to be removed from an image.

In step 308, additional identifying information is designated for removal from the image. This may be done using functionality provided by de-identification process 124, or by image processing process 122 as part of an image review workflow. For example, a user may add a manual de-identification marker to an image to designate additional information to be removed from an image. FIG. 4C depicts a manual de-identification marker, in the form of a circle 408, that was manually added by a user to designate additional information to be removed from image 400. In the example depicted in FIGS. 4A-4C, image 400 includes additional identifying information in the form of a unique tattoo that might be used to identify the patient Mike Tyson. In the example depicted in FIG. 4C, information inside circle 408 is designated to be retained, while information outside circle 408 is designated for removal. The particular manner in which additional identifying information is designated may vary depending upon a particular implementation and the particular tools made available via image processing process 122.

In step 310, the additional identifying information is removed from the image. The removal of the additional identifying information may be initiated by a user of image processing process 122. For example, a user of image processing application 112 may select one or more controls to create circle 408 on image 400, and then select one or more other controls to cause the additional information outside circle 408 to be deleted or removed from image 400. FIG. 4D depicts the removal of the additional information outside circle 408, except for encoded data 404. In this example, encoded data 404 is not removed because encoded data 404 does not include any identifying information. According to one embodiment, encoded data 404 that is included within a region of additional identifying information is also removed from the image.

In step 312, the processed image data, with the identifying information removed, is stored, for example, as processed image data 134 in image repository 130.

One example code implementation for removing identifying information from image data using markers is included below in Table I. This example implementation operates on an image, specified as "Test01.jpg," that includes marker 230 of FIG. 2B, and the implementation removes identifying information 234 while retaining other information 236. In this example, the image "Test01.jpg" is defined to have a layout of three adjacent squares of equal size. The leftmost square contains the barcode, the center square contains PHI, and the rightmost square contains non-PHI information about the photograph being taken. In this case, the barcode number 1, is pre-defined to have this layout.

TABLE I

```
var photo_image = 0; var photo_canvas, photo_ctx = 0;
// used to keep track of the detected barcode
var barcode = {
    number: 1,
    // four pixel locations, note that (0,0) origin is upper left for HTML5 canavas
    // ul - upper left, ll - lower left, ur - upper right, lr - lower right
    ul: {x: 0, y: 0}, ll: {x: 0, y: −300}, ur: {x: 300, y: 0}, lr: {x: 300, y: −300}};
function de_identify( ) {
    switch (barcode.number) {
        case 1:
            de_identify_barcode_01( );
            break;
        case 2:
            de_identify_barcode_02( );
            break;
        default:
            // unknown code, do nothing
            break;
    }
}
```

TABLE I-continued

```
}
function de_identify_barcode_01( ) {
    photo_ctx.clearRect(barcode.ur.x,barcode.ur.y,barcode.ur.x-barcode.ul.x,
Math.abs(barcode.ur.y-
barcode.lr.y));
}
function de_identify_barcode_02( ) {
    photo_ctx.clearRect(barcode.ur.x,barcode.ur.y,2*(barcode.ur.x-
barcode.ul.x),Math.abs(barcode.ur.y-barcode.lr.y));
}
function init_after_photo( ) {
    // find barcode information using external software such as Vinta-
Soft Barcode SDK, which
populates barcode variable
        photo_canvas.width = photo_image.width;
        photo_canvas.height = photo_image.height;
        photo_ctx.drawImage(photo_image, 0, 0, photo_image.width, pho-
to_image.height);
        window.setTimeout(de_identify,1000);
}
function init( ) {
    photo_image = document.createElement("img");
    photo_image.onload = function( ) {init_after_photo( );}
    photo_canvas = document.getElementById("Photo");
    photo_ctx = photo_canvas.getContext("2d");
    photo_image.src = 'Test01.jpg'; // test image
}
</script> </head>
<body onload="init( )">
<canvas id="Photo" style="position: absolute; left: 0; top: 0;"></canvas>
</body> </html>
```

Figure 2F:
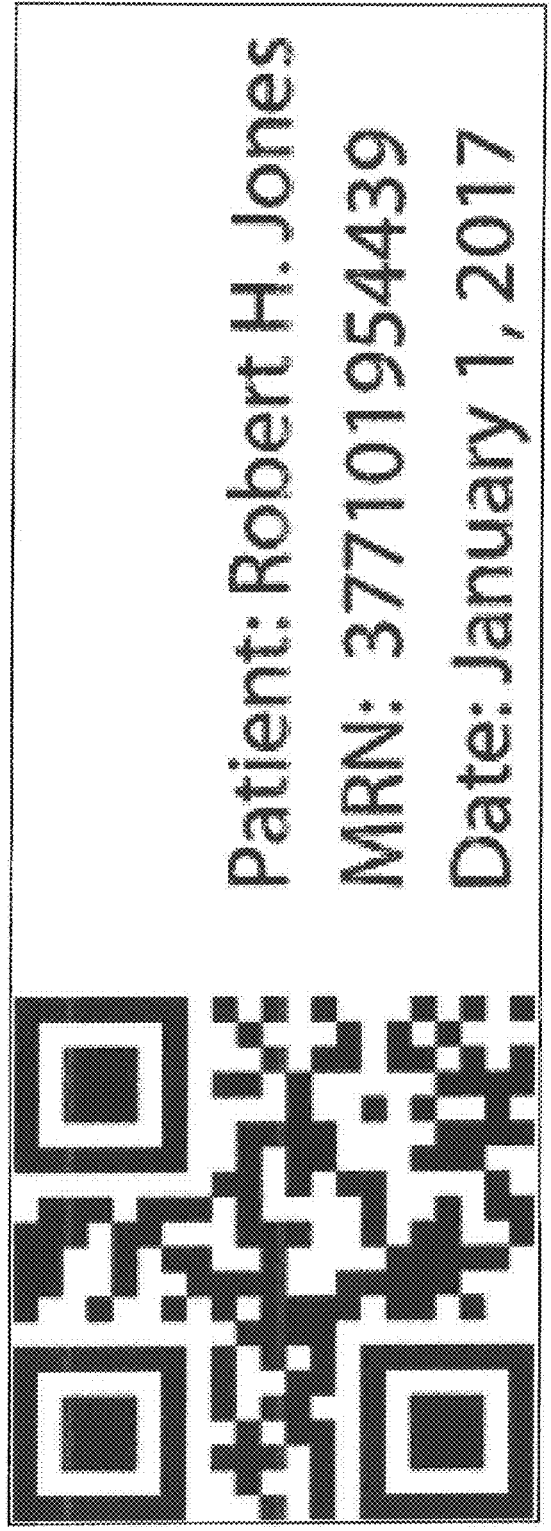
FIG. 2F depicts a marker in the form of a patient ID label or card that may be placed on, or attached to, a patient.

Another example code implementation for removing identifying information from image data using markers is included below in Table II. This example implementation operates on an image, specified as "Test02.jpg," that includes marker 280 as depicted in FIG. 2F. In this example, the image "Test02.jpg" is also again a three square layout, however, both the center square and the rightmost square are used for PHI, so they are both removed. In this case, the barcode number 2, is pre-defined to have this layout.

TABLE II

```
<html> <head> <script>
var photo_image = 0;  var photo_canvas, photo_ctx = 0;
// used to keep track of the detected barcode
var barcode = {
    number: 2,
    // four pixel locations, note that (0,0) origin is upper left for HTML5 canavas
    // ul - upper left, ll - lower left, ur - upper right, lr - lower right
    ul: {x: 0, y: 0}, ll: {x: 0, y: −300}, ur: {x: 300, y: 0}, lr: {x: 300, y: −300}};
function de_identify( ) {
    switch (barcode.number) {
        case 1:
            de_identify_barcode_01( );
            break;
        case 2:
            de_identify_barcode_02( );
            break;
        default:
            // unknown code, do nothing
            break;
    }
}
function de_identify_barcode_01( ) {
    photo_ctx.clearRect(barcode.ur.x,barcode.ur.y,barcode.ur.x-
barcode.ul.x,Math.abs(barcode.ur.y-barcode.lr.y));
}
function de_identify_barcode_02( ) {
    photo_ctx.clearRect(barcode.ur.x,barcode.ur.y,2*(barcode.ur.x-
barcode.ul.x),Math.abs(barcode.ur.y-barcode.lr.y));
}
function init_after_photo( ) {
    // find barcode information using external software such as VintaSoft Barcode SDK, which
populates barcode variable
```

TABLE II-continued

```
      photo_canvas.width = photo_image.width;
      photo_canvas.height = photo_image.height;
      photo_ctx.drawImage(photo_image, 0, 0, photo_image.width, photo_image.height);
      window.setTimeout(de_identify,1000);
}
function init( ) {
   photo_image = document.createElement("img");
   photo_image.onload = function( ) {init_after_photo( );}
   photo_canvas = document.getElementById("Photo");
   photo_ctx = photo_canvas.getContext("2d");
   photo_image.src = 'Test02.jpg'; // test image
}
</script> </head>
<body onload="init( )">
<canvas id="Photo" style="position: absolute; left: 0; top: 0;"></canvas>
</body> </html>
```

V. Implementation Examples

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
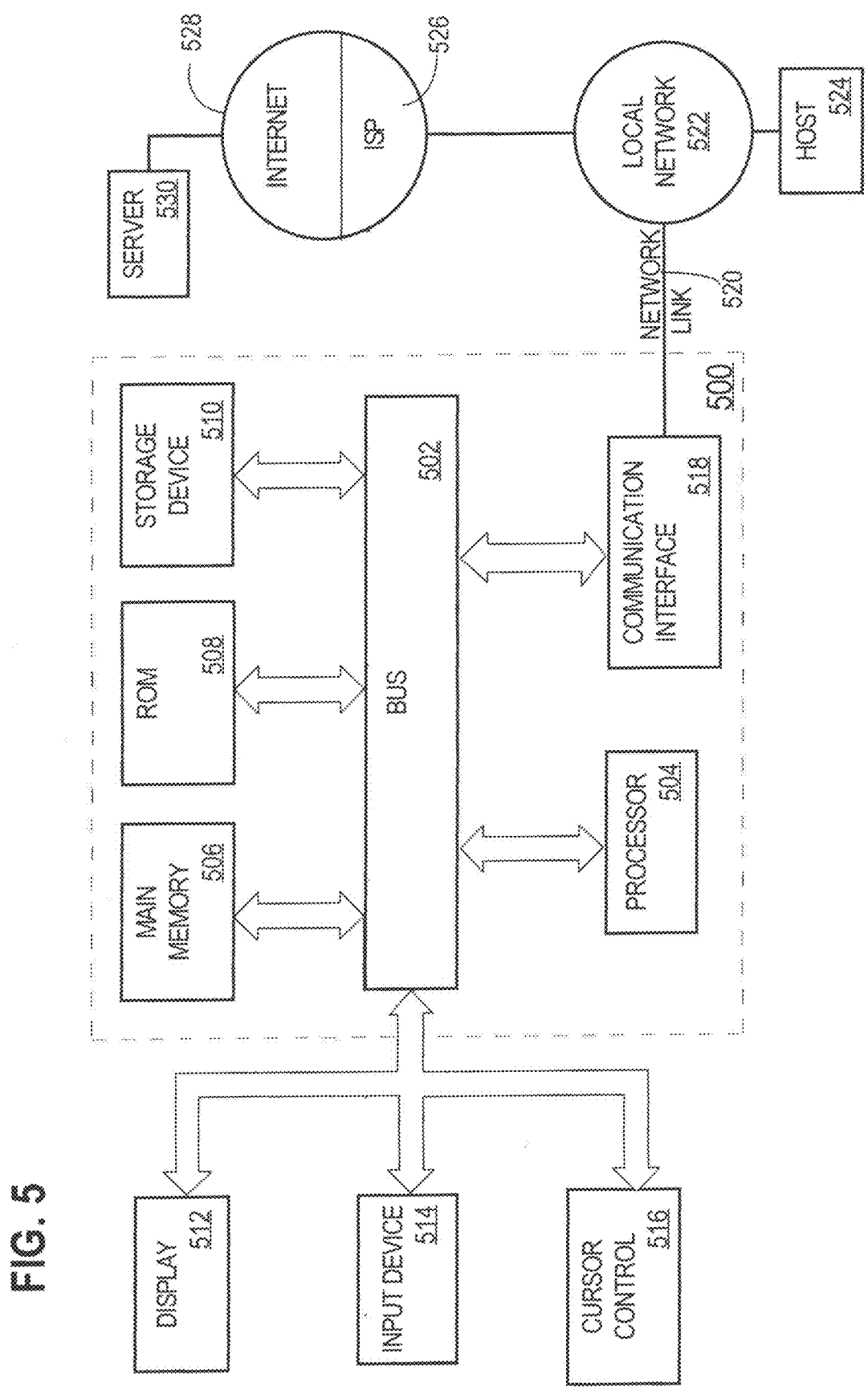
FIG. 5 is a block diagram that depicts an example computer system upon which embodiments may be implemented.

FIG. 5 is a block diagram that depicts an example computer system 500 upon which embodiments may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. Although bus 502 is illustrated as a single bus, bus 502 may comprise one or more buses. For example, bus 502 may include without limitation a control bus by which processor 504 controls other devices within computer system 500, an address bus by which processor 504 specifies memory locations of instructions for execution, or any other type of bus for transferring data or signals between components of computer system 500.

An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic or computer software which, in combination with the computer system, causes or programs computer system 500 to be a special-purpose machine. According to one embodiment, those techniques are performed by computer system 500 in response to processor 504 processing instructions stored in main memory 506. Such instructions may be read into main memory 506 from another non-transitory computer-readable medium, such as storage device 510. Processing of the instructions contained in main memory 506 by processor 504 causes performance of the functionality described herein. In alternative embodiments, hard-wired circuitry may be used in place of or in combination with software instructions to implement the embodiments. Thus, embodiments are not limited to any specific combination of hardware circuitry and software.

The term "non-transitory computer-readable medium" as used herein refers to any non-transitory medium that participates in providing data that causes a computer to operate in a specific manner. In an embodiment implemented using computer system 500, various computer-readable media are involved, for example, in providing instructions to processor 504 for execution. Such media may take many forms, including but not limited to, non-volatile and volatile non-transitory media. Non-volatile non-transitory media includes, for example, optical or magnetic disks, such as storage device 510. Volatile non-transitory media includes dynamic memory, such as main memory 506. Common forms of non-transitory computer-readable media include, without limitation, a floppy disk, a flexible disk, hard disk, magnetic tape, or any other magnetic medium, a CD-ROM, any other optical medium, a RAM, a PROM, and EPROM, a FLASH-EPROM, any other memory chip, memory cartridge or memory stick, or any other medium from which a computer can read.

Various forms of non-transitory computer-readable media may be involved in storing instructions for processing by processor 504. For example, the instructions may initially be stored on a storage medium of a remote computer and transmitted to computer system 500 via one or more communications links. Bus 502 carries the data to main memory 506, from which processor 504 retrieves and processes the instructions. The instructions received by main memory 506 may optionally be stored on storage device 510 either before or after processing by processor 504.

Computer system 500 also includes a communication interface 518 coupled to bus 502. Communication interface 518 provides a communications coupling to a network link 520 that is connected to a local network 522. For example, communication interface 518 may be a modem to provide a data communication connection to a telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be processed by processor 504 as it is received, and/or stored in storage device 510, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
   one or more processors; and
   one or more memories storing instructions which, when processed by the one or more processors, cause:
   retrieving first image data for an image of one or more objects, wherein the image of the one or more objects includes one or more markers that were present in the image of the one or more objects when the image of the one or more objects was captured, and wherein the one or more markers are represented in the first image data;
   determining, based upon the one or more markers included in the image of the one or more objects, identifying information to be removed from the image of the one or more objects; wherein the identifying information identifies one or more persons,
   generating, based upon the first image data and the identifying information to be removed from the image of the one or more objects, second image data that includes the first image data but without the identifying information.

2. The apparatus of claim 1, wherein at least a portion of the identifying information to be removed from the image of the one or more objects is contained in one or more markers from the one or more markers.

3. The apparatus of claim 1, wherein:
   the identifying information to be removed from the image of the one or more objects is outside the one or more markers; and
   the identifying information to be removed from the image of the one or more objects is determined based upon identification or location information contained in the one or more markers.

4. The apparatus of claim 3, wherein the identification or location information contained in the one or more markers is in encoded form.

5. The apparatus of claim 1, wherein the one or more markers include one or more of one or more cards, one or more tags, one or more stickers, one or more watermarks, or non-visible information.

6. The apparatus of claim 1, wherein:
   the one or more markers include two or more markers; and
   the identifying information to be removed from the image of the one or more objects is defined by locations of the two or more markers in the image of the one or more objects.

7. The apparatus of claim 1, wherein:
   the one or more markers include two or more markers;
   the one or more memories store additional instructions which, when processed by the one or more processors, cause determining one or more angles at which the image of the one or more objects was captured; and
   the determining, based upon the one or more markers in the image of the one or more objects, identifying information to be removed from the image of the one or more objects includes determining, based upon the two or more markers in the image of the one or more objects and the one or more angles at which the image of the one or more objects was captured, the identifying information to be removed from the image of the one or more objects.

8. The apparatus of claim 1, wherein:
   the one or more markers specify other information in the image of the one or more objects; and
   the one or more memories store additional instructions which, when processed by the one or more processors, cause designating the image of the one or more objects for subsequent manual processing to remove the other information from the image of the one or more objects.

9. One or more non-transitory computer-readable media storing instructions which, when processed by one or more processors, cause:
   retrieving first image data for an image of one or more objects, wherein the image of the one or more objects includes one or more markers that were present in the image of the one or more objects when the image of the one or more objects was captured; and wherein the one or more markers are represented in the first image data;

determining, based upon the one or more markers included in the image of the one or more objects, identifying information to be removed from the image of the one or more objects; wherein the identifying information identifies one or more persons, generating, based upon the first image data and the identifying information to be removed from the image of the one or more objects, second image data that includes the first image data but without the identifying information.

10. The one or more non-transitory computer-readable media of claim 9, wherein at least a portion of the identifying information to be removed from the image of the one or more objects is contained in one or more markers from the one or more markers.

11. The one or more non-transitory computer-readable media of claim 9, wherein:

the identifying information to be removed from the image of the one or more objects is outside the one or more markers; and the identifying information to be removed from the image of the one or more objects is determined based upon identification or location information contained in the one or more markers.

12. The one or more non-transitory computer-readable media of claim 11, wherein the identification or location information contained in the one or more markers is in encoded form.

13. The one or more non-transitory computer-readable media of claim 9, wherein the one or more markers include one or more of one or more cards, one or more tags, or one or more stickers, one or more watermarks, or non-visible information.

14. The one or more non-transitory computer-readable media of claim 9, wherein:

the one or more markers include two or more markers; and the identifying information to be removed from the image of the one or more objects is defined by locations of the two or more markers in the image of the one or more objects.

15. The one or more non-transitory computer-readable media of claim 9, wherein:

the one or more markers include two or more markers;

the one or more non-transitory computer-readable media store additional instructions which, when processed by the one or more processors, cause determining one or more angles at which the image of the one or more objects was captured; and the determining, based upon the one or more markers in the image of the one or more objects, identifying information to be removed from the image of the one or more objects includes determining, based upon the two or more markers in the image of the one or more objects and the one or more angles at which the image of the one or more objects was captured, the identifying information to be removed from the image.

16. The one or more non-transitory computer-readable media of claim 9, wherein:

the one or more markers specify other information in the image of the one or more objects; and the one or more non-transitory computer-readable media store additional instructions which, when processed by the one or more processors, cause designating the image for subsequent manual processing to remove the other information from the image of the one or more objects.

17. A computer-implemented method comprising:

retrieving first image data for an image of one or more objects, wherein the image of the one or more objects includes one or more markers that were present in the image of the one or more objects when the image of the one or more objects was captured, and wherein the one or more markers are represented in the first image data;

determining, based upon the one or more markers included in the image of the one or more objects, identifying information to be removed from the image of the one or more objects, wherein the identifying information identifies one or more persons;

generating, based upon the first image data and the identifying information to be removed from the image of the one or more objects, second image data that includes the first image data but without the identifying information.

18. The computer-implemented method of claim 17, wherein at least a portion of the identifying information to be removed from the image of the one or more objects is contained in one or more markers from the one or more markers.

19. The computer-implemented method of claim 17, wherein:

the identifying information to be removed from the image of the one or more objects is outside the one or more markers; and the identifying information to be removed from the image of the one or more objects is determined based upon identification or location information contained in the one or more markers.

20. The computer-implemented method of claim 19, wherein the identification or location information contained in the one or more markers is in encoded form.

* * * * *